(12) United States Patent
Bojjireddy et al.

(10) Patent No.: US 10,776,459 B2
(45) Date of Patent: Sep. 15, 2020

(54) FACILITATING BUILD AND DEPLOY RUNTIME MEMORY ENCRYPTED CLOUD APPLICATIONS AND CONTAINERS

(71) Applicant: International Business Machines Corporation, Armonk, NY (US)

(72) Inventors: Karunakar Bojjireddy, Apex, NC (US); Sreekanth Ramakrishna Iyer, Bangalore (IN); Pratheek Karnati, Raleigh, NC (US); Nataraj Nagaratnam, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 15/834,931

(22) Filed: Dec. 7, 2017

(65) Prior Publication Data
US 2019/0180006 A1 Jun. 13, 2019

(51) Int. Cl.
| | | |
|---|---|---|
| *G06F 21/12* | (2013.01) | |
| *G06F 12/14* | (2006.01) | |
| *G06F 21/53* | (2013.01) | |
| *G06F 21/62* | (2013.01) | |
| *H04L 29/06* | (2006.01) | |

(Continued)

(52) U.S. Cl.
CPC .......... *G06F 21/12* (2013.01); *G06F 9/44578* (2013.01); *G06F 9/455* (2013.01); *G06F 9/45558* (2013.01); *G06F 12/1408* (2013.01); *G06F 21/53* (2013.01); *G06F 21/62* (2013.01); *H04L 63/0428* (2013.01); *G06F 8/60* (2013.01); *H04L 67/40* (2013.01)

(58) Field of Classification Search
CPC ...... G06F 21/12; G06F 12/1408; G06F 21/53; G06F 21/62; G06F 9/44578; G06F 9/45558; G06F 8/60; G06F 9/455; H04L 63/0428; H04L 67/40
See application file for complete search history.

(56) References Cited

U.S. PATENT DOCUMENTS 7,424,704 B2 * 9/2008 Orton .................. G06F 8/76 717/136
9,588,877 B1 * 3/2017 Adir .................. G06F 11/3608
(Continued)

OTHER PUBLICATIONS fortanix.com, "Fortanix—Runtime Encryption™ with Intel® SGX," Retrieved Nov. 6, 2017, 7 pages.
(Continued)

*Primary Examiner* — Abu S Sholeman
(74) *Attorney, Agent, or Firm* — Amin, Turocy & Watson, LLP

(57) ABSTRACT

Technologies for providing software code and data with in-memory protection through runtime memory encryption are described. A service comprising an integration component (an interface set) receives software program code and data that is to be protected in one or more protected areas of execution in memory. The integration component can integrate with a software development pipeline. The service (e.g. a wrapper engine component thereof) obtains the software program code and wraps the software program code and the data into a wrapped component. The service generates a secure counterpart program for executing in one or more protected areas of execution in memory (e.g., an enclave).

16 Claims, 15 Drawing Sheets

(51) Int. Cl.
*G06F 9/445* (2018.01)
*G06F 9/455* (2018.01)
*G06F 8/60* (2018.01)

(56) References Cited

U.S. PATENT DOCUMENTS

| | | | |
|---|---|---|---|
| 9,606,774 B2* | 3/2017 | Walker | G06F 8/65 |
| 9,870,313 B2* | 1/2018 | Adir | G06Q 10/06395 |
| 9,898,395 B2* | 2/2018 | Adir | G06Q 30/018 |
| 10,073,758 B2* | 9/2018 | Gulkis | G06F 21/53 |
| 2008/0155539 A1* | 6/2008 | Darland | G06F 16/2308 |
| | | | 718/100 |
| 2016/0182531 A1* | 6/2016 | Rubakha | H04L 63/123 |
| | | | 726/1 |
| 2017/0329622 A1* | 11/2017 | Sherwin, Jr. | G06F 9/45533 |
| 2018/0137299 A1* | 5/2018 | Porter | H04L 63/126 |

OTHER PUBLICATIONS software.intel.com, "Intel® Software Guard Extensions (Intel® SGX)," Retrieved Nov. 6, 2017, 4 pages.

Arnautov, et al., "SCONE: Secure Linux Containers with Intel SGX," Proceedings of the 12th USENIX Symposium on Operating Systems Design and Implementation (OSDI '16). Nov. 2-4, 2016 • Savannah, GA, USA, 17 pages.

* cited by examiner

FACILITATING BUILD AND DEPLOY RUNTIME MEMORY ENCRYPTED CLOUD APPLICATIONS AND CONTAINERS

BACKGROUND

The subject disclosure relates to secure computing, and more specifically, to providing software code and data with in-memory protection through runtime memory encryption.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating securing program code and data are described.

According to an embodiment, a system can comprise a memory that stores computer executable components and a processor that executes computer executable components stored in the memory. The computer executable components can comprise an integration component to a service, the integration component comprising an interface set that receives software program code and data that is to be protected in one or more protected areas of execution in memory. The computer executable components can further comprise a wrapper engine component of the service that obtains the software program code and the data from the integration component and wraps the software program code and the data into a wrapped component, and generates secure counterpart software program code for execution in one or more protected areas of execution in memory.

According to another embodiment, a computer-implemented method is provided. The computer-implemented method can comprise receiving, by a system operatively coupled to a processor, via an interface set of a service coupled to a software development pipeline, software program code and data for protecting via in-memory protection. The computer-implemented method can further comprise wrapping, by the system, the software program code and the data into a wrapped component, and generating, by the system, secure counterpart software program code capable of executing in one or more protected areas of execution in memory.

According to yet another embodiment, a computer program product facilitating securing program code and data can be provided, the computer program product comprising a computer readable storage medium having program instructions embodied therewith. The program instructions can be executable by a processor to cause the processor to provide an interface set to a service integrated with a software development pipeline to receive software program code of the software development pipeline for protecting via in-memory protection. Further program instructions can be executable by a processor to cause the processor to wrap the software program code for protecting via in-memory protection into a wrapped component, and generate secure counterpart software program code for execution in one or more protected areas of execution in memory.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
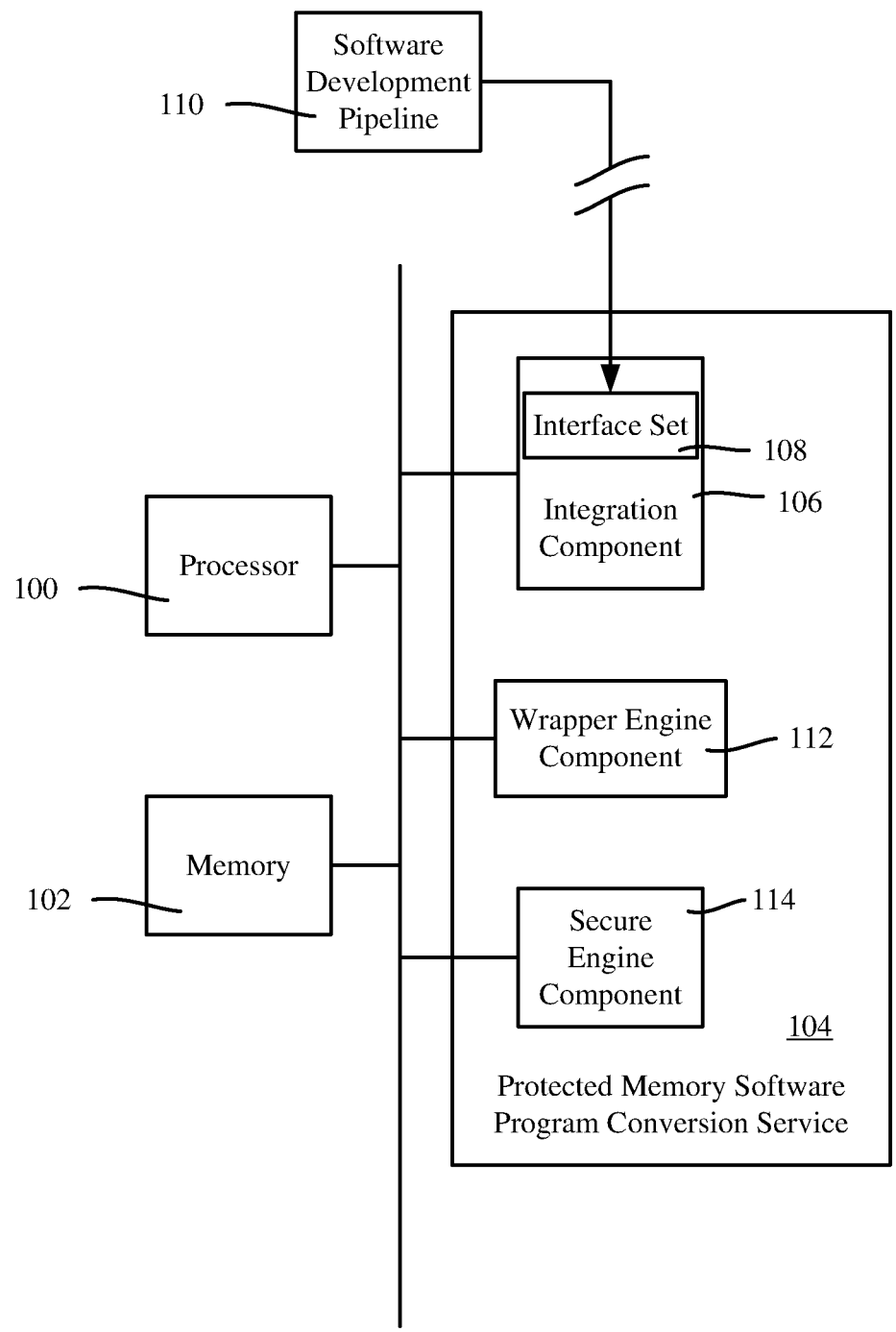
FIG. 1 is a block diagram of an example, non-limiting system that illustrates various aspects of the technology in accordance with one or more embodiments described herein.

FIG. 1 illustrates an example of a processor 100 and memory 102 coupled to components of a protected memory software program conversion service 104. As can be seen, an integration component 106 comprises an interface set 108, by which a software development pipeline 110 couples to the protected memory software program conversion service 104. The protected memory software program conversion service 104 comprises a wrapper engine component 112 and a secure engine component 114.

In one or more embodiments, the interface set 108 provides API endpoints to authenticate, to integrate with the service 104 (e.g., by providing the respective service identifiers and keys), to download application images, to pull curated apps, to submit unsecure code (to generate secure counterpart program code that will run in a protected memory area (an enclave)), and to convert an application to secure counterpart code that runs in an enclave when executed. The wrapper engine component's functionality is made available as a set of APIs (application programming interfaces)/SDKs (software development kits), or can be made available as a service on cloud to integrate with existing Dev-Ops process, for example.

In general, the wrapper engine component 112 wraps the given code or applications, such as with the appropriate supported runtimes and SDK output, respectively. The secure engine component 114 provides for the digital signing of the code, and also provides a remote attestation service for the enclaves.

With respect to authentication, the technology described herein can provide a mechanism for users to authenticate with the service 104, and provision the users with an API key. Thereafter, users, typically comprising developers and build pipelines, interact with the service 104 via their API keys. Note that the service 104 can support web hooks or the like to integrate with open source or third-party CI/CD pipelines. This allows the service 104 to automatically trigger at the correct point in the build pipeline, such as post build, or post containerization, for example.

In general and as described herein, software program code such as an application program and its associated program data in the software development pipeline 110 is received by the protected memory software program conversion service 104. Via the wrapper engine component 112 and secure engine component 114, the protected memory software program conversion service 104 processes the received program (which can be specified parts of the code) and data into a secure counterpart program (and data) that runs in a protected memory, sometimes referred to herein as an "enclave" for convenience, wherein an enclave is a trusted execution environment embedded in a process. In general, software that runs in an enclave and its data is protected in that neither the code nor data can be accessed by any software not resident in the enclave. An example of such protected memory for executing code and maintaining associated data of that code comprises one or more Intel® Software Guard Extensions (SGX) enclaves. Other protection technologies that can be leveraged by the technology described herein include IBM Z® SSC (Secure Service Container).

In one or more embodiments described herein, the technology provides a secure DevOps (software development (Dev) and software operation (Ops)) process that accepts software programs (e.g., applications, microservices, containers, etc.) in virtually any runtime and builds a secure counterpart program (e.g., running in an enclave), that can run natively or in a container on a supported host. The enclave for executing the secure counterpart program is capable of providing in-memory protection through runtime memory encryption and preventing external access.

One such secure technology for application developers seeking to protect select code and data from disclosure or modification comprises Intel® SGX. In general and as is known, Intel® SGX makes such protection available through the use of enclaves, which are protected areas of execution in memory that protect code and data through runtime memory encryption.

As described herein, the technology can be implemented in a service that integrates with a software development (e.g., DevOps) pipeline 110. The service 104 receives a software program via an interface to the pipeline 110, for example an application or one of the services in a microservice-based application, and generates secure counterpart code that will run in one or more (e.g., SGX) enclaves for some part (or all) of that software program. The exemplified service 104 is capable of generating secure counterpart code to run in enclaves for both native applications and Docker containers that run on SGX supported infrastructure. Note that for container enclaves, the service 104 integrates with Docker registries to push the generated secure containers. A similar registry can be used to pull container images, such as described herein with reference to FIG. 9.

The integration with the pipeline 110 is through a set of APIs 108 of the service 104. The integration can be automated; for example event-driven mechanisms can be triggered upon successful completion of earlier phases in a DevOps pipeline to automate the building of the one or more secure applications that can run in an enclave. The service described herein removes the SGX/enclave development overhead from the development teams; indeed, in many circumstances developers are able to use their existing respective design/development mechanisms, yet implement the usage of enclaves even though the developers can be oblivious of enclaves. Note that this is in contrast to contemporary solutions that put specific data in protected areas of execution in memory, necessitate significant re-engineering of program code via specialized, skill developers and cannot be done with many runtimes, only a few select runtimes such as C or C++.

Figure 2:
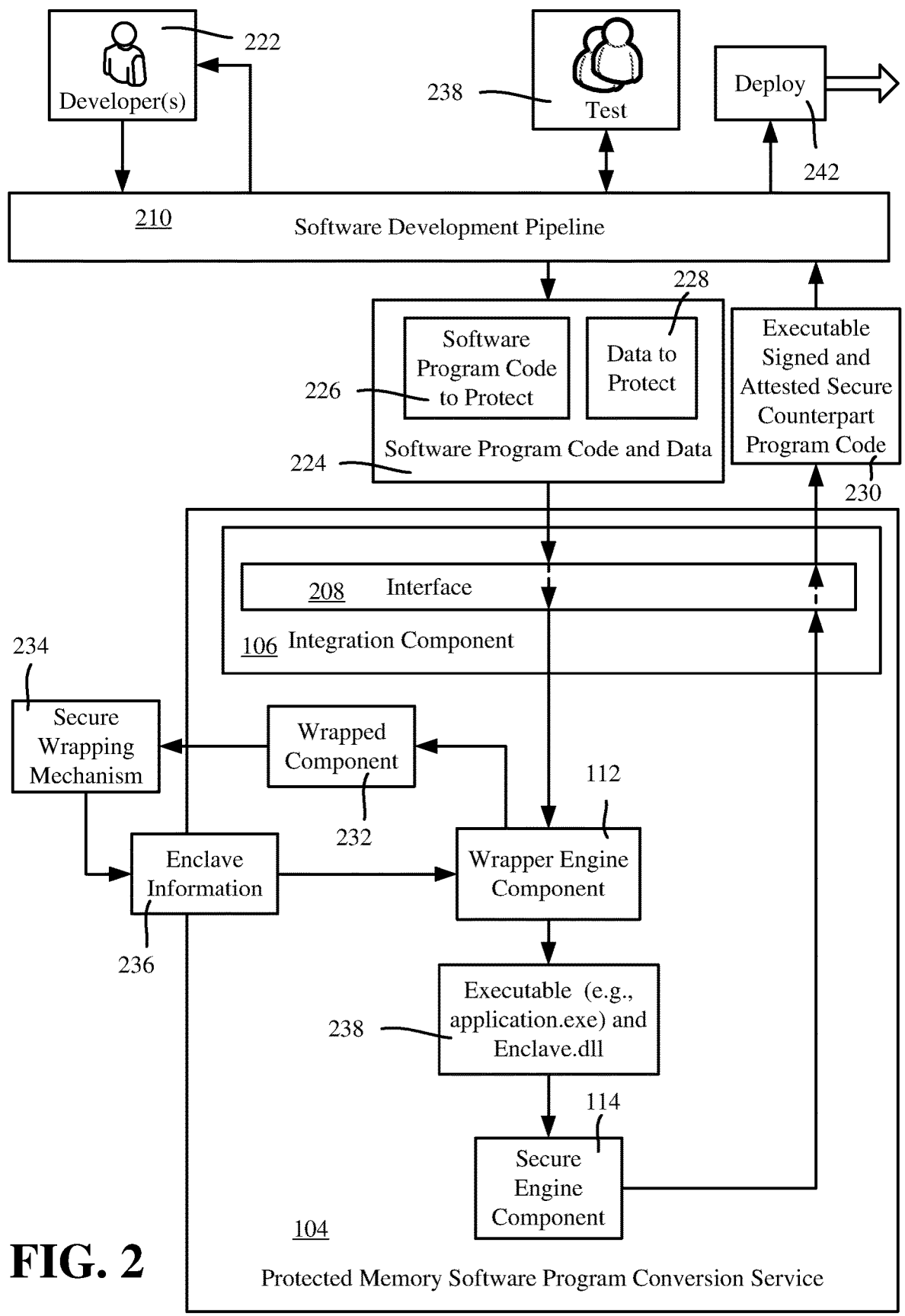
FIG. 2 illustrates a diagram representing example components corresponding to the various technical aspects of FIG. 1 comprising a protected memory software program conversion service coupled to a software development pipeline in accordance with one or more embodiments described herein.

FIG. 2 shows an example implementation for integrating the protected memory software program conversion service with a software development pipeline 110. In general, one or more developers 222 write code (or take existing code) and place the software code into an enterprise's pipeline 210 (e.g. corresponding to the pipeline 110 of FIG. 1). When this occurs, a triggering mechanism or the like provides a copy of the code (and any data) 224 to the service 104 via a suitable interface 208 (of the interface set 108 of FIG. 1) of the integration component 106. Note that all of the code and data can be intended for protection, or one or more certain portions of that code 226 and data 228 can be designated for protection. As will be understood, the service 104 accepts containers as well, and thus as used herein, "secure code," "secure program code" or "secure software program code" refers to any executable code that is configured to execute in protected memory, including but not limited to applications, services, containers and so forth.

The protected memory software program conversion service 104 receives the program code 224 and processes the program code 224 into signed and attested secure executable counterpart program code 230 (e.g., application.exe) that when executed will run within an enclave. To this end, the wrapper engine component 112 wraps the software program code and data with "glue" as appropriate into a wrapped component 232 and provides the wrapped component 232 to a secure wrapping mechanism 234. Note that one such secure enclave wrapping mechanism is commercially available from Fortanix Incorporated. Notwithstanding, other technologies including custom software development kits (SDKs) can be developed to process software code into secure counterpart program code for running in an enclave, including to support certain languages or SDKs, such as to support software providers using other software code languages in their software development pipelines. For example, SDKs can be ported to SGX to extend the supported SDKs, and can leverage the already-ported SDKs from the open source community. For example, examples for RUST provided by the open source community are publicly available on the internet.

The secure wrapping mechanism 234 returns enclave information 236 which is basically the secure counterpart executable program code 238 that when run will be protected within an enclave via an enclave (enclave.dll). However, for security purposes needed to execute the secure program code in one or more embodiments, the wrapper engine component 112 provides the executable and enclave.dll to the secure engine component 114, which digitally signs and attests this secure counterpart program, whereby the signed and attested secure counterpart program 230 is returned to the pipeline 210 in response to the API call to the service 104.

Once returned to the pipeline 210, additional testing (block 240), revision as needed, and so forth can be performed using the executable signed and attested secure counterpart program code 230. When deemed ready, the program can be deployed (block 242), e.g., as a cloud application, container, or the like.

Thus, with the technology described herein, the wrapper engine component 112 takes in virtually any runtime package, data or code of the program (e.g., application or container), and wraps it so that the program runs in protected areas and reads and writes its data from and to protected areas. Thus, even if a memory dump of the wrapped application when it is running is taken, the content is protected. Because of the wrapper technology, the service is able to protect virtually any types of runtimes/applications/containers and data in memory.

Figure 3:
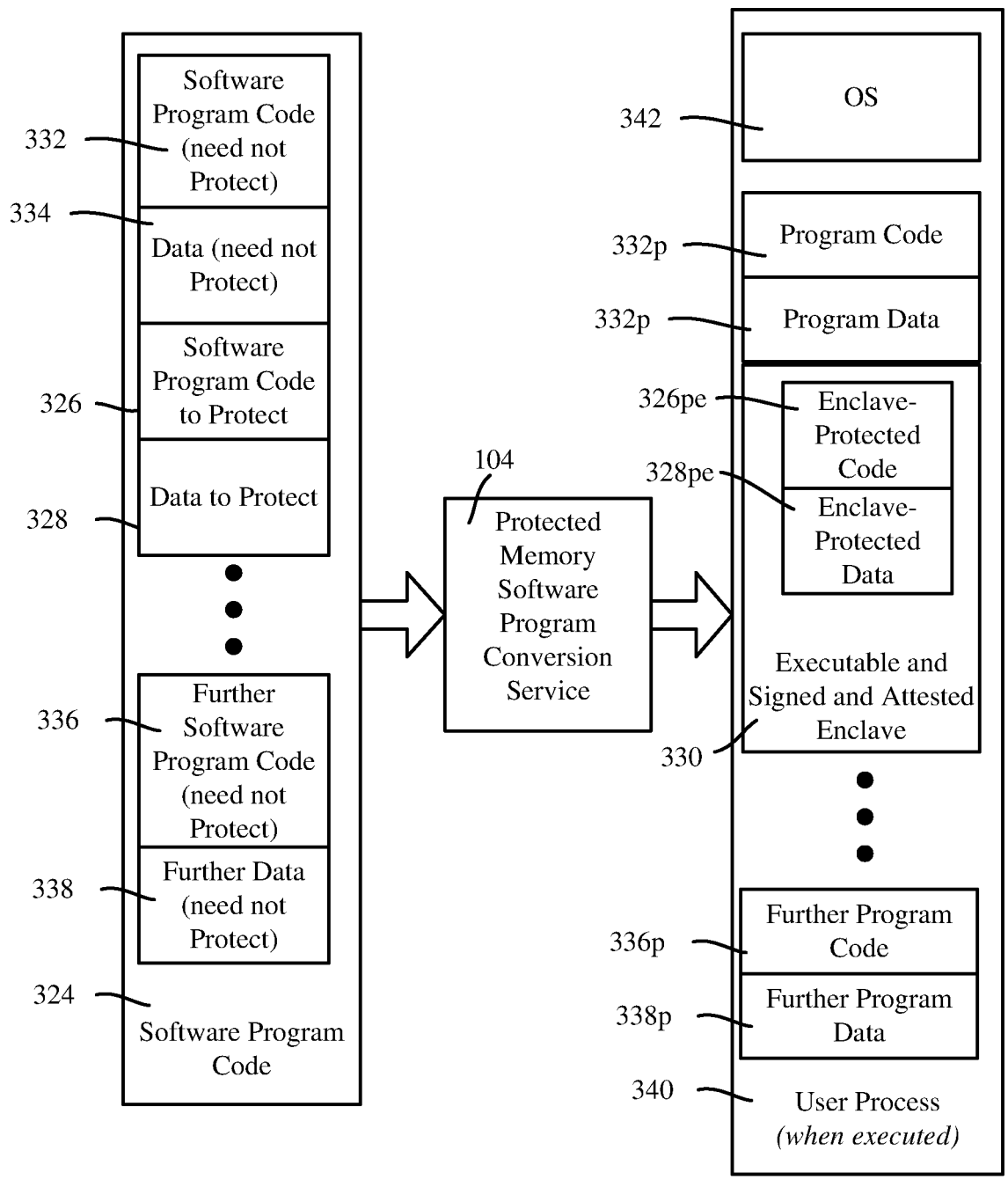
FIG. 3 illustrates an example representing converting a software program code to code including secure program code that executes in a protective enclave in accordance with one or more embodiments described herein.

FIG. 3 shows an example of taking software program code 324 (including data) and processing that code 324 into a user process 340, in which part of the code is executed (and data read/written) in an enclave. Note that Intel® SGX enclave technology supports the continuous run of trusted and untrusted code, supports multiple enclaves and supports multi-threaded enclaves.

In the example of FIG. 3, the software program code 324 includes software program code 332 and 336, along with data 334 and 338 that a developer or the like as indicated does not need in-memory protection. In addition, certain code 326 and data 328 has been indicated as needing in-memory protection. For example, a developer can designate code and data that deals with sensitive user information such as financial data as needing in-memory protection, whereas other code and data (e.g., that displays a logo and generic greeting) need not be protected and can be designated as not needing in-memory protection. This allows a program to operate efficiently (e.g., without the computational overhead of encryption and decryption) when not needed, yet have sensitive portions of the code and data execute in protected memory areas. Note that this is only one possible way to use the technology described herein; another straightforward way is for the entire program and its data to be protected via the technology described herein, without the developer even needing to know about the in-memory protection of the code.

As described above, the protected memory software program conversion service 104 receives the software program code 324 and returns the signed and attested counterpart code for running in an enclave 330. When executed in a user process 340 for example, the code in the enclave 330 is part of the program (application) and the now enclave-protected code 326$pe$ has full access to its enclave-protected data 328$pe$ in protected memory; ("pe" indicates the process enclave). Also shown in the user process 340 of FIG. 3 is an operating system 342, along with the non-protected code portions 332$p$, 336$p$ and their respective non-protected data 332$p$ and 338$p$ ("p" indicates process).

Figure 4:
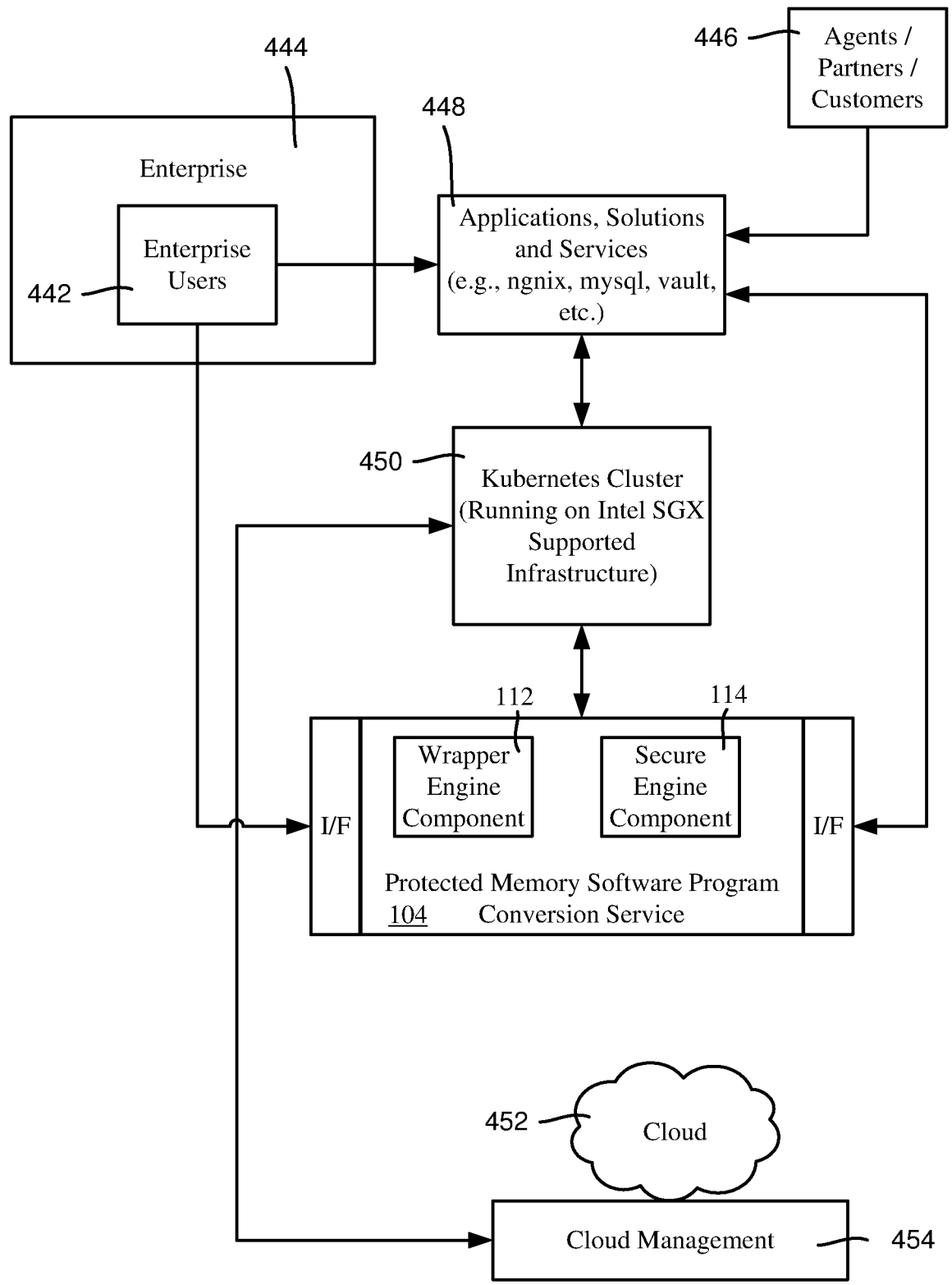
FIG. 4 illustrates an example diagram representing the integration of a software development pipeline and a protected memory software program conversion service to deploy protected code to a secure cloud execution environment in accordance with one or more embodiments described herein.

FIG. 4 shows an example of how the protected memory software program conversion service 104 can be used by various entities, such as enterprise users 442 of an enterprise 444 and/or agents/partners/customers 446. For example, the enterprise users 442, and/or the agents/partners/customers 446 can be developers that provide applications, solutions and/or services (block 448) to the protected memory software program conversion service 104. In the example of FIG. 4, the enterprise users also can, via a software development pipeline, provide code more directly to the protected memory software program conversion service 104.

As described above, as accessed via its interfaces (I/F) 108, the service 104 comprises a wrapper engine component and secure engine component 114 that work in tandem while providing API endpoints that integrate with continuous integration and deployment (DevOps) pipelines. The wrapper engine component 112 takes a container or an application and any associated libraries in virtually any runtime, and wraps the container or application and libraries inside a wrapped component (e.g., a binary blob) that is configured to leverage secure enclave technology, e.g., based on Intel Corporation's SGX technology. The secure engine component 114 takes the wrapped component from wrapper engine component 112 and signs and attests the secure counterpart code, e.g. using Intel Corporation's SDK to create code compatible with SGX enclaves.

Also shown in FIG. 4 is the running of the secured program code (block 448) on an exemplified Kubernetes cluster 450, as part of a cloud infrastructure 452 accessed via cloud management functionality 454.

Figure 5:
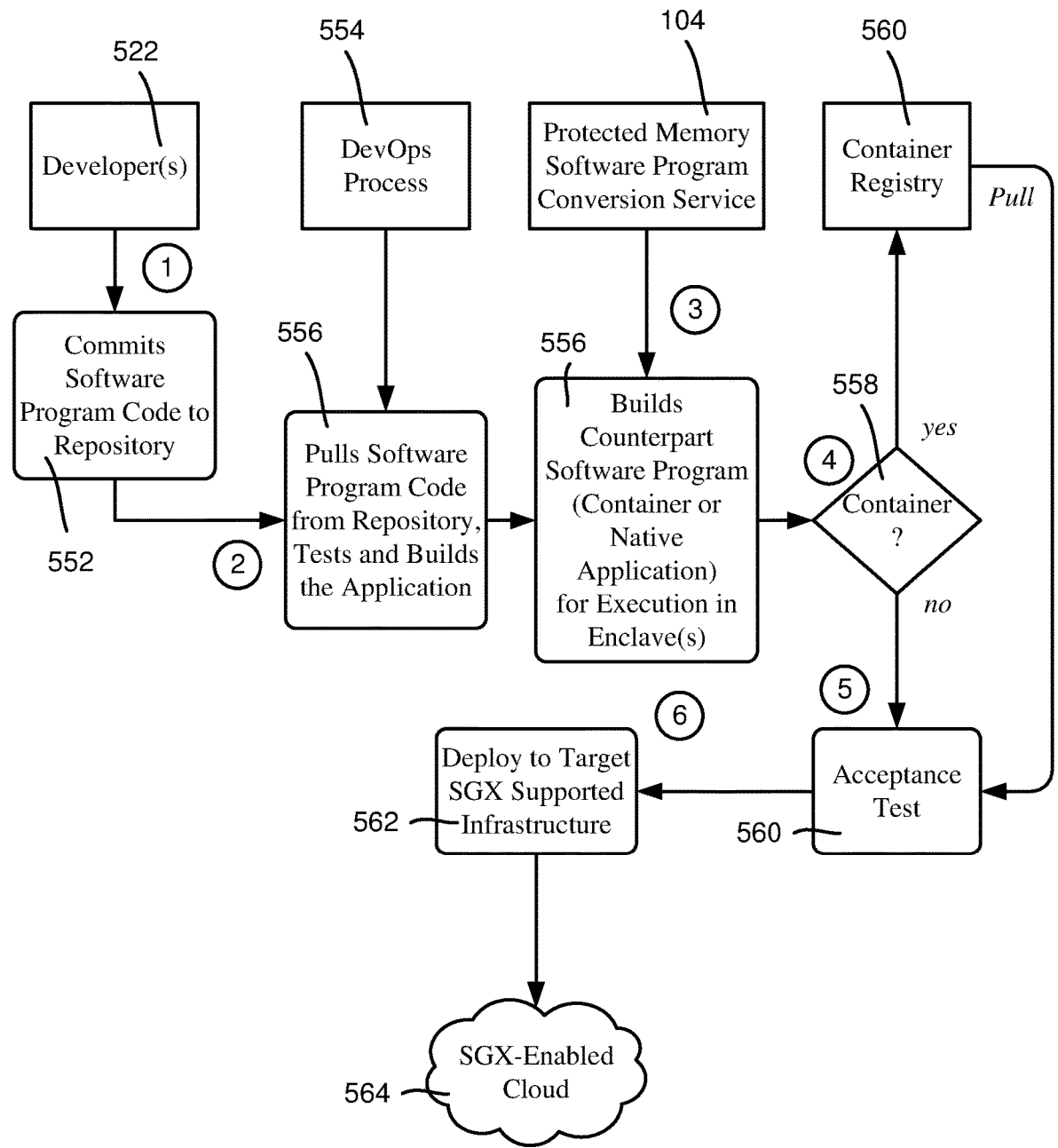
FIG. 5 illustrates an example diagram representing a flow of a software program in a software development pipeline to a protected memory software program conversion service and the deploying of corresponding protected code to a secure cloud execution environment in accordance with one or more embodiments described herein.

FIG. 5 exemplifies the development-to-deployment process from the perspective of a DevOps pipeline in conjunction with the protected memory software program conversion service 104. As represented in FIG. 5 via block 552, one or more developers 522 commit software program code to a repository of the pipeline, as generally represented via circled numeral one (1).

As generally represented via circled numeral two (2), a process 554 of the DevOps pipeline pulls the software program code from the repository, tests the program and builds an application (block 556). As described herein, the protected memory software program conversion service 104 obtains (e.g., via an automated call to its interface set) the software program code and builds the one or more enclave-compatible parts (block 558), corresponding to circled numeral three (3).

Note that in the example of FIG. 5, the delivered enclave-compatible program can correspond to a native application that runs on enclave-capable hardware or a container image. In one or more embodiments, native application deliverables are pushed to an image repository provided by the user, or deployed to a server capable of running enclaves. Alternatively, users can manually download a native application through an API call, such as in FIG. 2. Container image deliverables are pushed to a container image registry provided by the user, or the image can be deployed to a server capable of running container enclaves.

As generally represented in FIG. 5 via circled numeral four (4), the generated programs(s) are passed on to the next phases in the DevOps pipeline, typically for acceptance tests. If the generated enclave is a container (block 558), the container enclave is saved to a container registry (block 560) before the container reaches the acceptance test(s) phase (circled numeral five (5), block 560)).

Once the tests are passed, the enclaves are deployed to the appropriate (e.g., Intel® SGX) supported infrastructure (block 562) for execution on the cloud (block 564).

Figure 6:
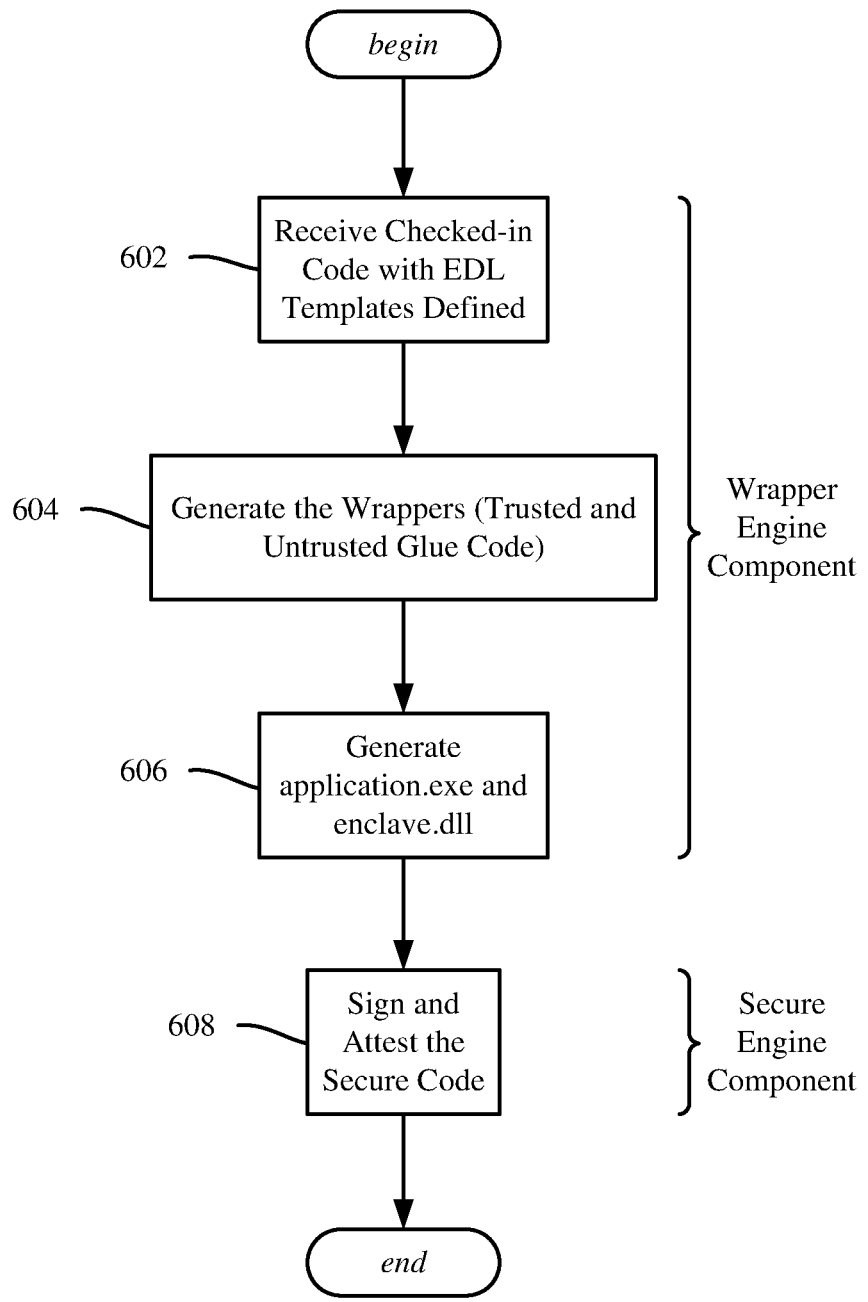
FIGS. 6-9 illustrate an example use case scenarios for integrating with a protected memory software program conversion service in accordance with one or more embodiments described herein.

Turning to various alternative use cases for using the protection service 104 described herein, note that the use cases generally range from minimal user involvement to no user involvement from the perspective of the developers. FIG. 6 shows an example use case through SDKs, in which the operations described therein are exemplified as steps.

In FIG. 6, the exemplary users have some knowledge of SGX technologies and how they work. In this example, the users define an EDL (Enclave Definition Language) template file that defines the trusted and untrusted code and data, that is, the trusted and untrusted functions, and data types used in the respective functions.

Step 602 of FIG. 6 represents the service 104 (the wrapper engine component 112) receiving the checked-in code with the EDL templates defined. At step 604, the service generates the trusted and un-trusted glue code (the wrappers for the code). Note that the service 104 supports/provides SDKs beyond C/C++. Community provided SDKs, such as RUST ported to SGX, for example, or custom SDKs, can be used, for example.

At step 606, the wrapper engine component 112 of the service 104 generates the secure code for execution in an enclave, e.g., application.exe and enclave.dll. At step 608, the secure engine component 114 of the service 104 signs and attests the secure code as appropriate for running in an enclave.

Figure 7:
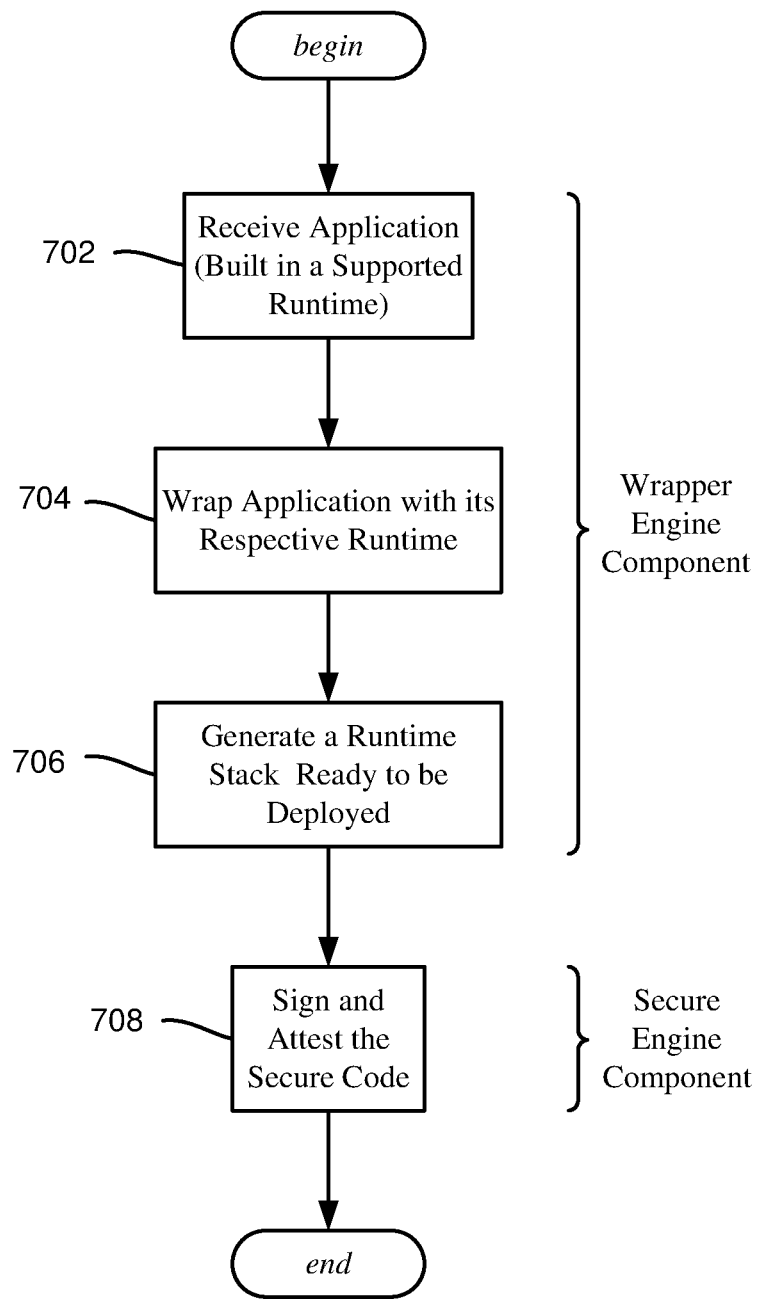

FIG. 7 shows operations exemplified as steps for an alternative use case that operates through runtimes. In this scenario, the users/developers can be totally oblivious to enclave technology.

As represented by step 702, the wrapper engine component 112 of the service 104 obtains the application built in one of the supported runtimes. At step 704, the wrapper engine component 112 wraps the application with its respective runtime.

At step 706, the wrapper engine component 112 generates a runtime stack ready to be deployed. At step 708, the secure engine component 114 of the service 104 signs and attests the secure counterpart program code.

With respect to supporting runtimes beyond C/C++, the technology operates by wrapping the application inside the library OS graphene (Graphene Library OS), or an in-house wrapper (e.g., which works similar to graphene) and is lightweight; for specific use cases. As a result, the user's applications perceive the wrapper as any other x86_64 system, however the library OS is ported to SGX, so in effect, the application runs in an enclave.

Figure 8:
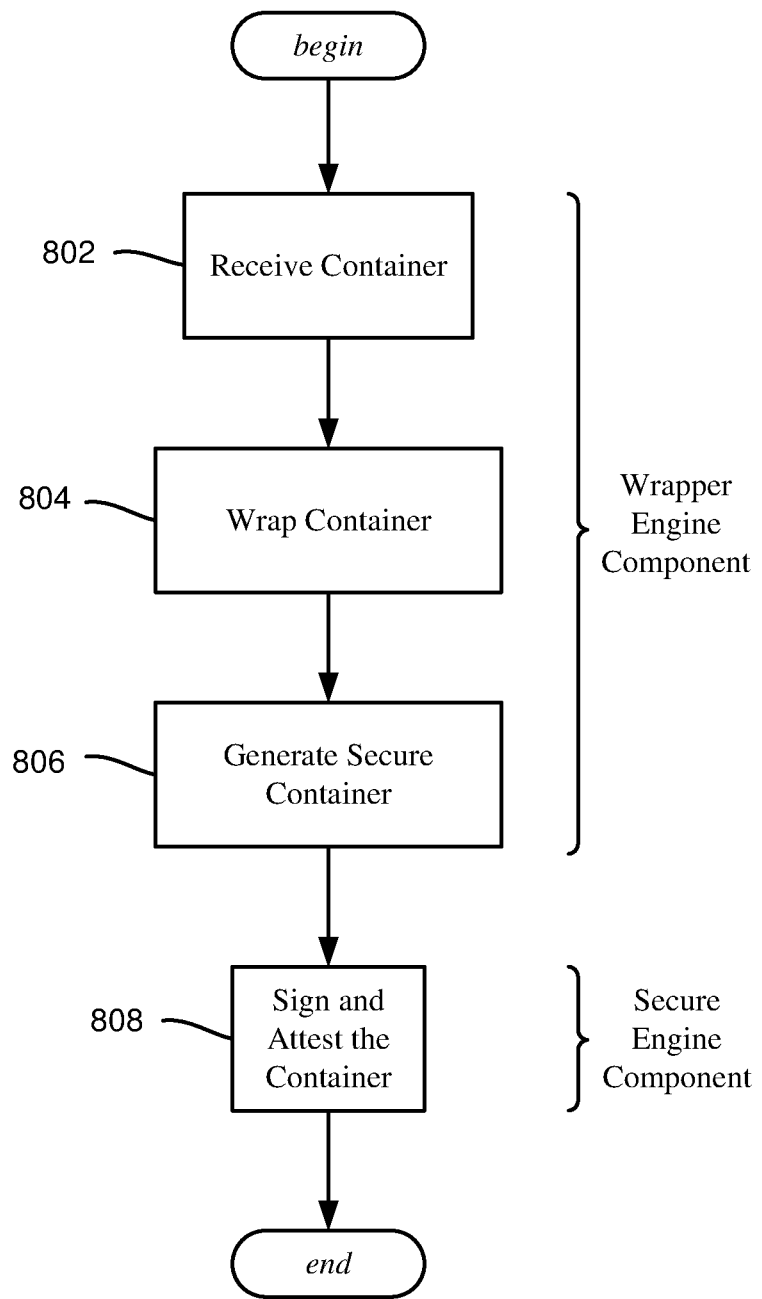

FIG. 8 shows operations exemplified as steps for an alternative use case that operates with containers. In this scenario, the users/developers can be totally oblivious to enclave technology.

As represented by step 802, the wrapper engine component 112 of the service 104 obtains the container. At step 804, the wrapper engine component 112 wraps the container. At step 806, the wrapper engine component 112 generates a secure counterpart container ready to be deployed. At step 808, the secure engine component 114 of the service 104 signs and attests the container.

Note that containers work somewhat similar to runtimes as described above in that the application runs inside the library operating system, inside the container. The only gateway to SGX is the SGX driver (which is already installed on the host). The driver is mounted to the container using container device mounts, whereby the driver shows up at the same default location inside the container. The SGX calls made by the library operating system are tunneled back to the host (because the SGX driver loaded in the container is the same as the one on the host). To summarize, the built application is wrapped inside the library operating system, and then a container image is built off the wrapped blob. Then the SGX driver is mounted to the container using device mounts.

Figure 9:
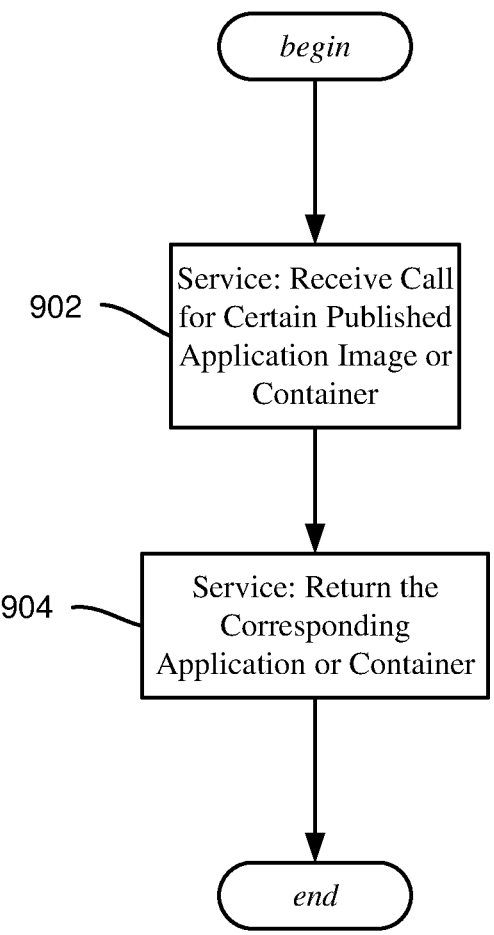

FIG. 9 is directed towards curated applications or other program code, comprising a use case that provides users with pre-built applications (for running in enclaves). In this use case scenario, users leverage one or more applications or other code (e.g., a container) "out of the box" and integrate them with the rest of their application. Some non-limiting examples include MySQL, Nginx, OpenDJ, Vault, Barbican client, etc. Secure containers, including pre-built containers, can be pulled from a container registry as well.

To this end, at block 902 the service receives a call for certain published application image, or a secure container, e.g., via an API call. At block 904, the service returns the secure pre-built application/code/container in response to the call.

As can be seen, there is described herein a technology to provide an automated way to secure the code and data of a software program in memory, such as a cloud native application deployed to a cloud. The technology comprises capability that combines an in-memory protection technology as well as a wrapper engine integrated with a secure DevOps process. For in-memory protection, one or more embodiments of the technology make use of available technologies such as enclaves, which protect data and/or code loaded in specific protected areas of execution in memory.

There is thus provided a service to convert native applications to run in secure enclaves and/or containers to run in secure container enclaves. The service extends Intel® SGX provides today, including by addressing some of its limitations, such as by providing runtime support for languages beyond C/C++, and eliminating any hard limit on total memory. The technology can convert a software program to a secure counterpart compatible with enclaves, which can then run on hardware capable of running secure enclaves, such as Intel® Xeon® E3, for example, or to a Docker container platform running on Intel® Xeon® E3. In various embodiments, there are thus three different types of input ([EDL plus code, built application in a supported runtime, or built container) and two corresponding outputs (secure native application or secure container).

Figure 10:
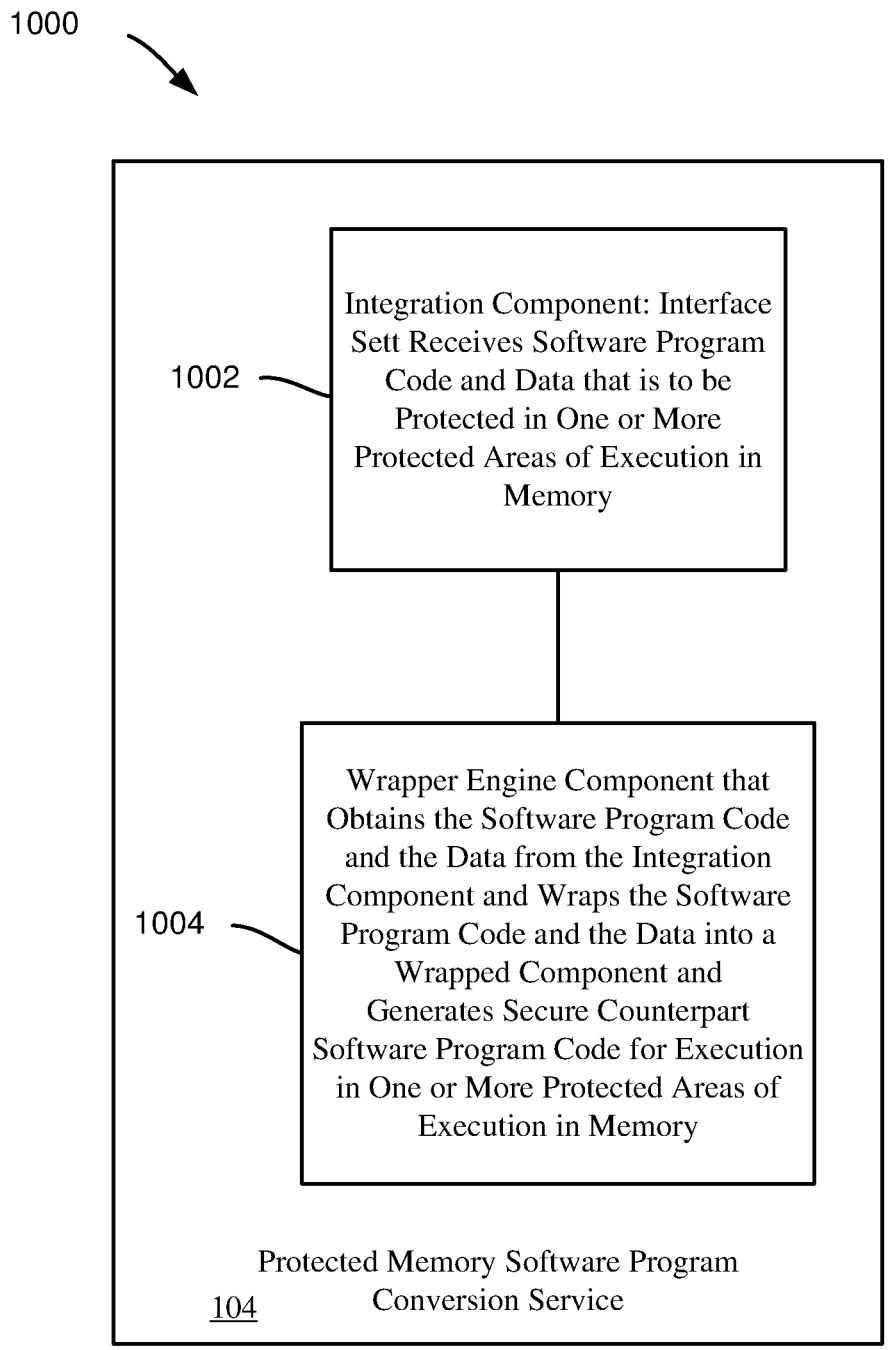
FIG. 10 illustrates a block diagram of an example, non-limiting system that facilitates securing program code in accordance with one or more embodiments described herein

FIG. 10 is a representation of a system 1000, which can comprise a memory that stores computer executable components and a processor that executes computer executable components stored in the memory. The computer executable components can comprise an integration component (represented by block 1002) to a service 104, the integration component 1002 comprising an interface set that receives software program code and data that is to be protected in one or more protected areas of execution in memory. The components can comprise a wrapper engine component (represented by block 1004) of the service that obtains the software program code and the data from the integration component and wraps the software program code and the data into a wrapped component, and generates secure counterpart software program code for execution in one or more protected areas of execution in memory.

The one or more protected areas of execution in memory into which the software code and data of the wrapped component are to be written for execution can be present within a cloud computing environment. The one or more protected areas of execution in memory into which the software code and data of the wrapped component are to be written for execution can comprise a secure computing environment. At least one of the one or more protected areas of execution in memory can comprise an Intel® Software Guard Extensions enclave.

Aspects can comprise a secure engine component of the service, coupled to the wrapper engine component, that signs and attends the secure counterpart software program code.

The secure counterpart software program code can comprise a secure container-based virtualization container, and aspects can further comprise a container registry integration component that saves the secure container-based virtualization container to a container registry.

The interface set can comprise an application programming interface (API) endpoint that provides an interface to the service. The service can comprise a cloud service, and the interface set can interface with the cloud service. The software program code can comprise a microservice of a microservice-based application. The software program code can comprise an application program and one or more libraries associated with the application program.

Figure 11:
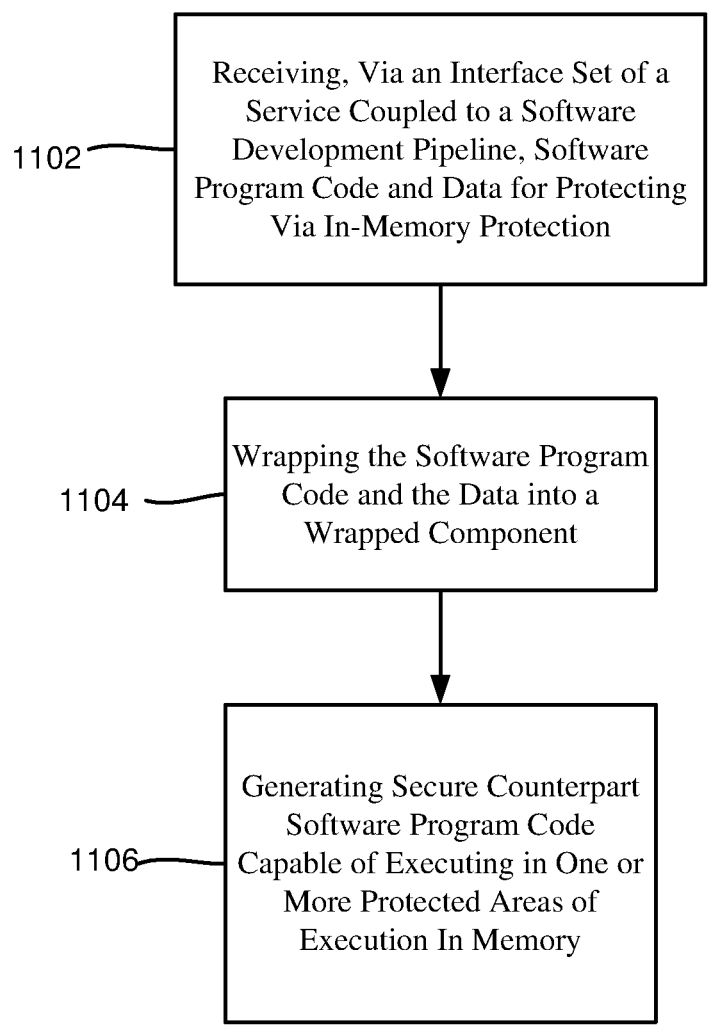
FIG. 11 illustrates a flow diagram of an example, non-limiting computer-implemented method in accordance with one or more embodiments described herein.

FIG. 11 shows example aspects of a computer-implemented method, which can comprise receiving (operation 1102), by a system operatively coupled to a processor, via an interface set of a service coupled to a software development pipeline, software program code and data for protecting via in-memory protection. Operation 1104 represents wrapping, by the system, the software program code and the data into a wrapped component. Operation 1106 represents generating, by the system, secure counterpart software program code capable of executing in one or more protected areas of execution in memory.

Generating the secure counterpart software program code can comprise generating an executable for executing in at least one Intel® Software Guard Extensions enclave. The software program code can correspond to a container-based virtualization container, and generating the secure counterpart software program code can comprise generating a secure container. The secure container can be saved to a container registry. The method can comprise running the secure counterpart software program code in protected memory of a cloud computing environment.

Figure 12:
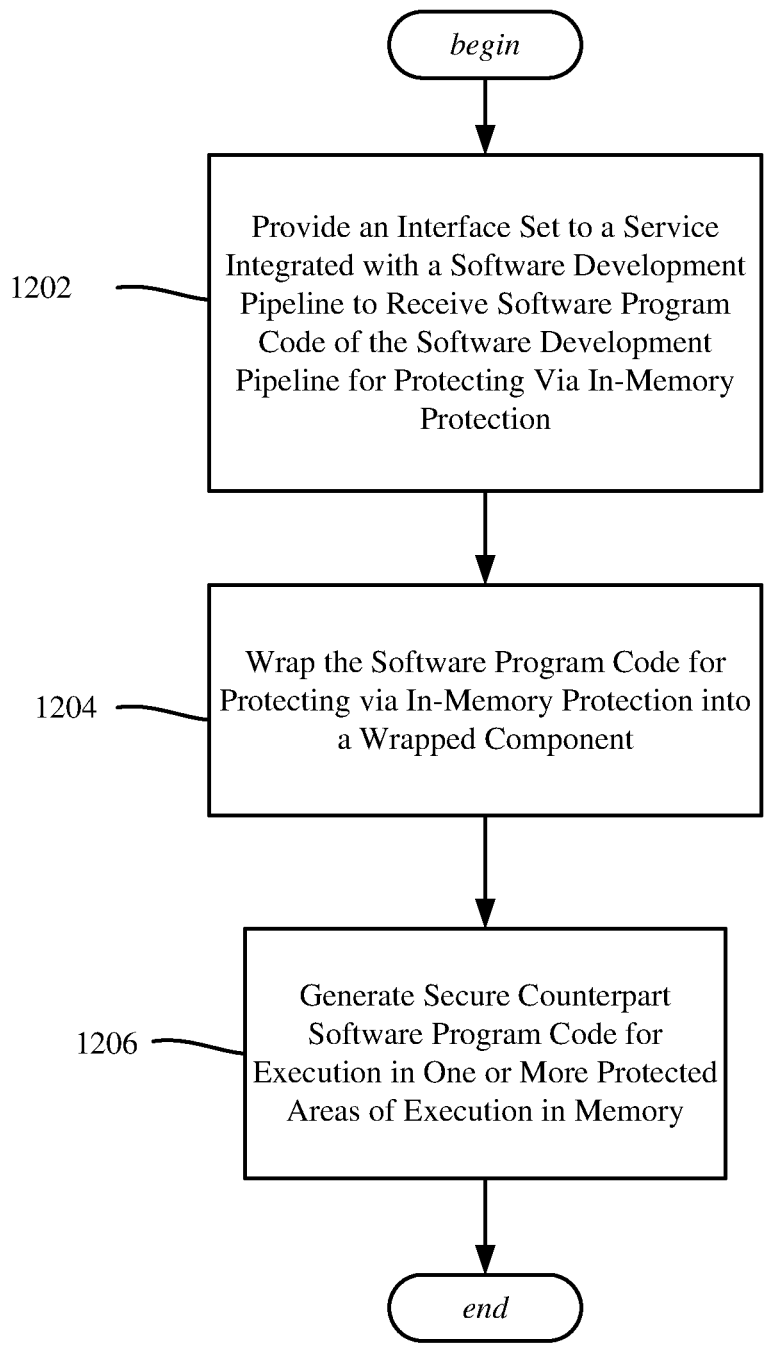
FIG. 12 illustrates a flow diagram of an example, non-limiting computer-program product facilitating securing program code and data in accordance with one or more embodiments described herein.

FIG. 12 exemplifies a computer program product facilitating securing program code and data, in which the computer program product comprises a computer readable storage medium having program instructions embodied therewith. The program instructions can be executable by a processor to cause the processor to provide (block 1202) an interface set to a service integrated with a software development pipeline to receive software program code of the software development pipeline for protecting via in-memory protection. Instructs can be executed to wrap (block 1204) the software program code for protecting via in-memory protection into a wrapped component, and generate secure counterpart software program code for execution in one or more protected areas of execution in memory.

Program instructions can be further executable by the processor to cause the processor to generate the secure counterpart software program code for execution in at least one Intel® Software Guard Extensions enclave. Program instructions can be further executable by the processor to cause the processor to determine that the software program code corresponds to a container-based virtualization container, and save the secure counterpart software program code as a secure container to a container registry.

Program instructions can be further executable by the processor to cause the processor to provide the secure counterpart software program code for execution in the secure memory of a cloud computing environment. The service integrated with the software development pipeline can comprise a cloud service, and the program instructions can be further executable by the processor to cause the processor to receive the software program code via the cloud service.

Figure 13:
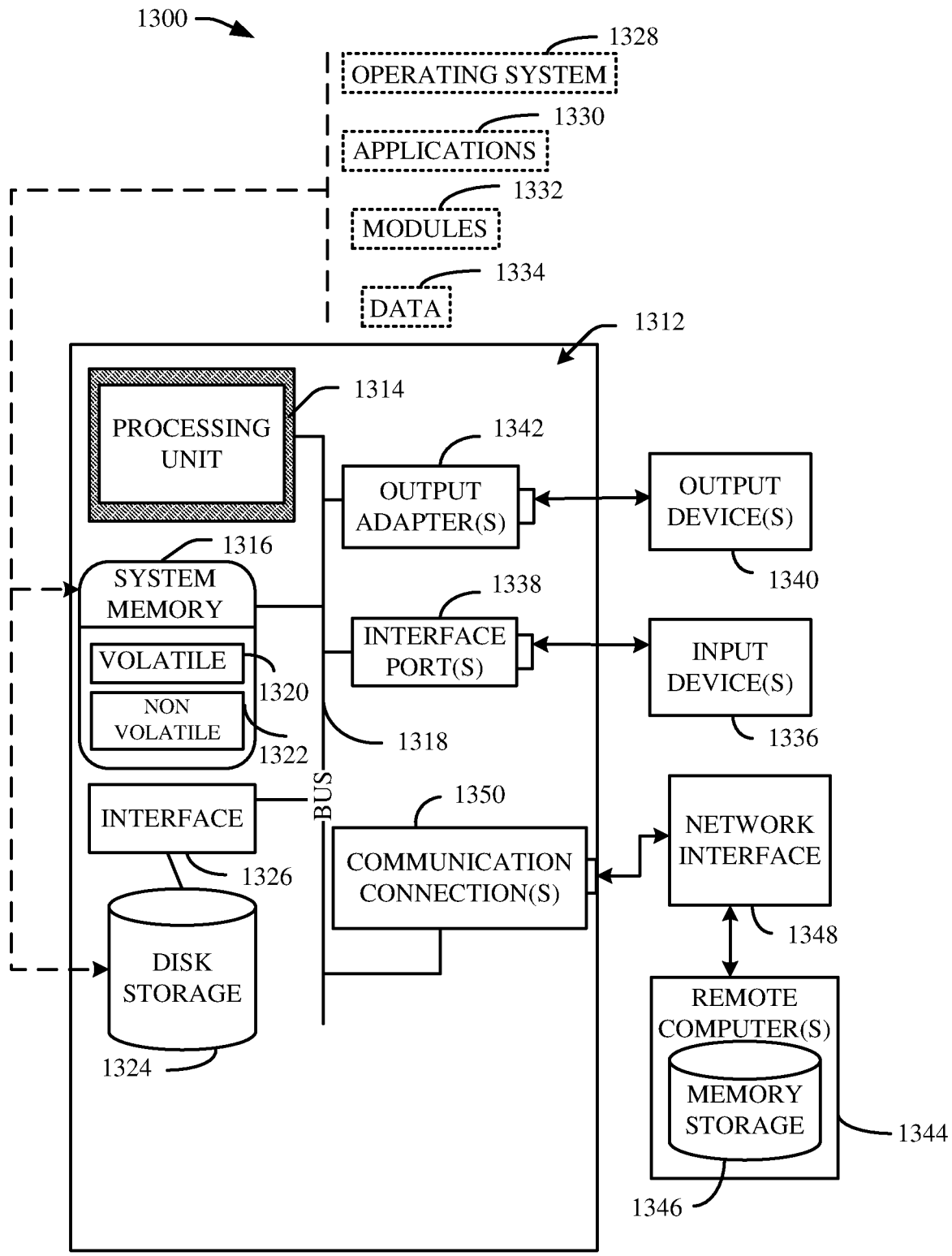
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media. To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312.

System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
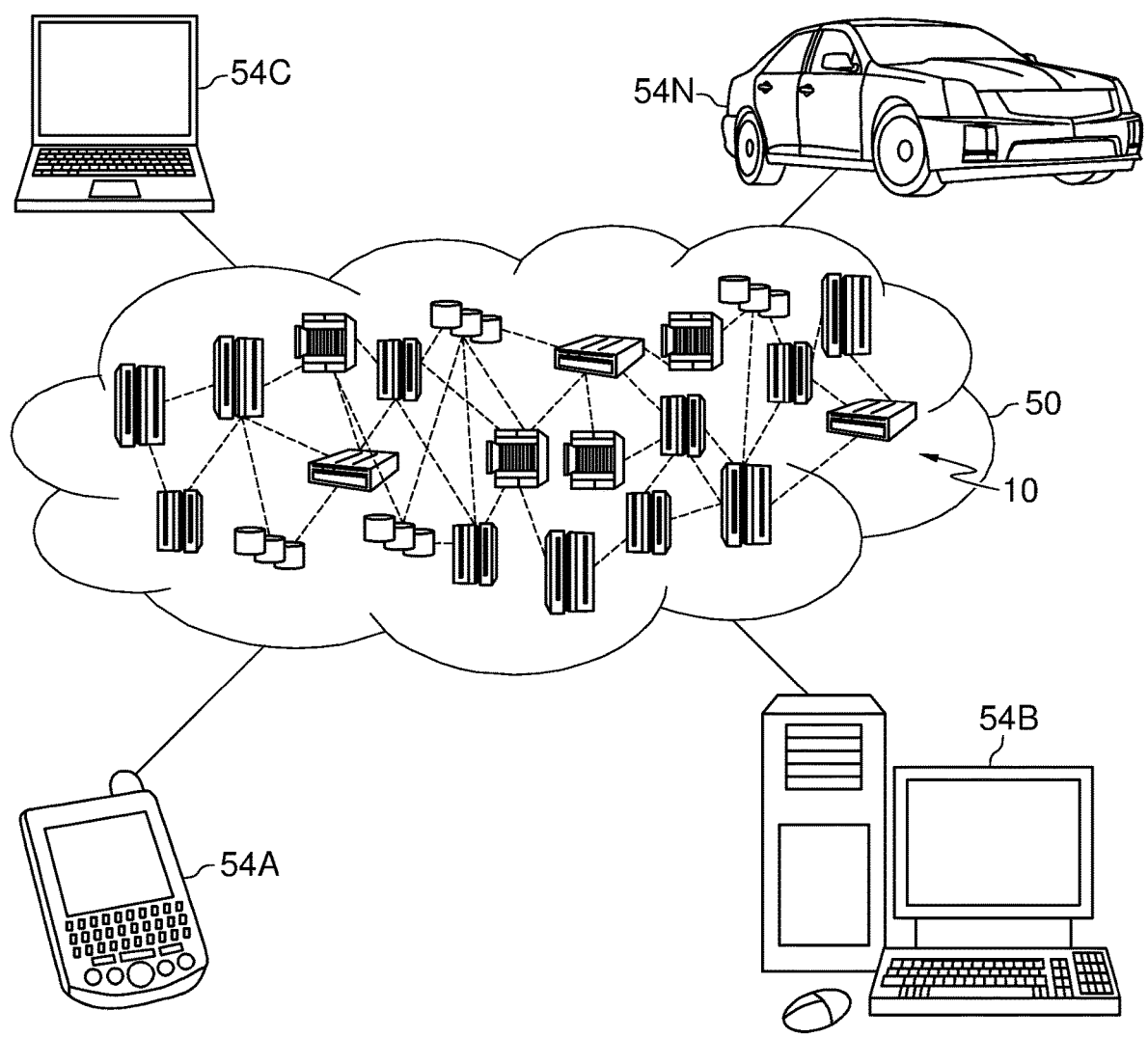
FIG. 14 depicts a cloud computing environment according to an embodiment of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
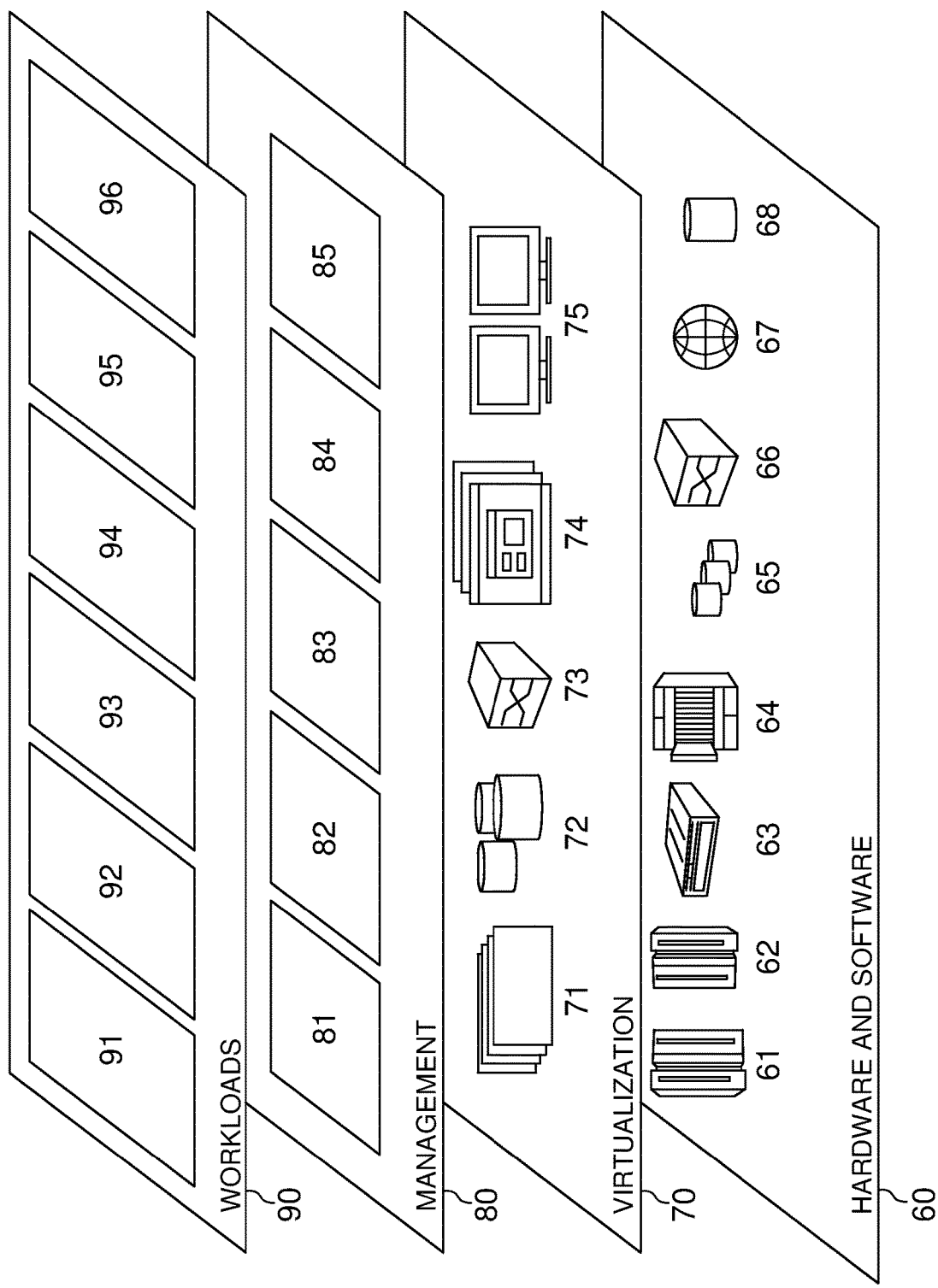
FIG. 15 depicts abstraction model layers according to an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and facilitating securing program code and data 96, including via build and deploy runtime memory encrypted cloud applications and containers.

Trademarks appearing herein are the property of their respective owners and used for identification and descriptive purposes only, given the nature of the subject matter at issue, and not to imply endorsement or affiliation in any way.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components;
 a processor that executes computer executable components stored in the memory, wherein the computer executable components comprise:
  an integration component to a service, the integration component comprising an interface set that receives software program code and data that is to be protected in one or more protected areas of execution in memory; and a wrapper engine component of the service that obtains the software program code and the data from the integration component and wraps the software program code and the data into a wrapped component, and generates secure counterpart software program code for execution in one or more protected areas of execution in memory, wherein the one or more protected areas of execution in memory into which the software program code and data of the wrapped component are to be written for execution comprise at least one of a secure computing environment or a cloud computing environment.

2. The system of claim 1, wherein at least one of the one or more protected areas of execution in memory comprises an Intel® Software Guard Extensions enclave.

3. The system of claim 1 further comprising a secure engine component of the service, coupled to the wrapper engine component, that signs and attests the secure counterpart software program code.

4. The system of claim 1, wherein the secure counterpart software program code comprises a secure container-based virtualization container, and further comprising a container registry integration component that saves the secure container-based virtualization container to a container registry.

5. The system of claim 1, wherein the interface set comprises an application programming interface (API) endpoint that provides an interface to the service.

6. The system of claim 1, wherein the service comprises a cloud service, and wherein the interface set interfaces with the cloud service.

7. The system of claim 1, wherein the software program code comprises a native application or a microservice of a microservice-based application.

8. The system of claim 1, wherein the software program code comprises an application program and one or more libraries associated with the application program.

9. A computer-implemented method, comprising:
receiving, by a system operatively coupled to a processor, via an interface set of a service coupled to a software development pipeline, software program code and data for protecting via in-memory protection;
wrapping, by the system, the software program code and the data into a wrapped component; and
generating, by the system, secure counterpart software program code that executes in one or more protected areas of execution in memory, wherein the software program code corresponds to a container-based virtualization container, and wherein the generating the secure counterpart software program code comprises generating a secure container.

10. The computer-implemented method of claim 9, wherein the generating the secure counterpart software program code comprises generating an executable for executing in at least one Intel® Software Guard Extensions enclave.

11. The computer-implemented method of claim 9, further comprising: saving, by the system, the secure container to a container registry.

12. The computer-implemented method of claim 9, further comprising, running the secure counterpart software program code in protected memory of a cloud computing environment.

13. A computer program product facilitating securing program code and data and comprising a computer readable storage medium having program instructions embodied therewith, the program instructions executable by a processor to cause the processor to:
provide an interface set to a service integrated with a software development pipeline to receive software program code of the software development pipeline for protecting via in-memory protection;
wrap the software program code for protecting by in-memory protection into a wrapped component;
generate secure counterpart software program code for execution in one or more protected areas of execution in memory;
determine that the software program code corresponds to a container-based virtualization container, and
save the secure counterpart software program code as a secure container to a container registry.

14. The computer program product of claim 13, wherein the program instructions are further executable by the processor to cause the processor to:
generate the secure counterpart software program code for execution in at least one Intel® Software Guard Extensions enclave.

15. The computer program product of claim 13, wherein the program instructions are further executable by the processor to cause the processor to:
provide the secure counterpart software program code for execution in the secure memory of a cloud computing environment.

16. The computer program product of claim 13, wherein the service integrated with the software development pipeline comprises a cloud service, and wherein the program instructions are further executable by the processor to cause the processor to receive the software program code via the cloud service.

* * * * *